July 27, 1965     M. WEITZMAN ETAL     3,197,548
WEATHERPROOF ELECTRICAL OUTLET BOX AND MOUNTING MEANS THEREFOR
Filed April 22, 1963
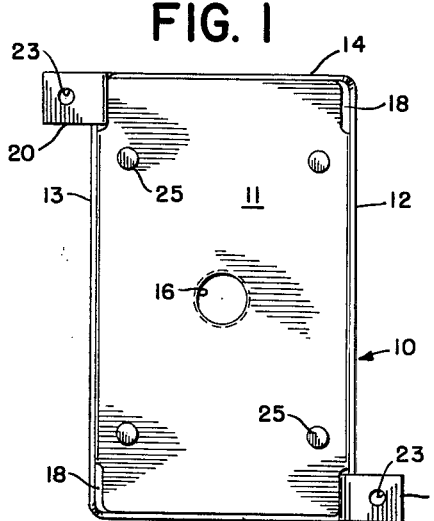
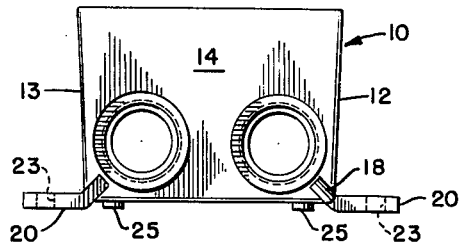
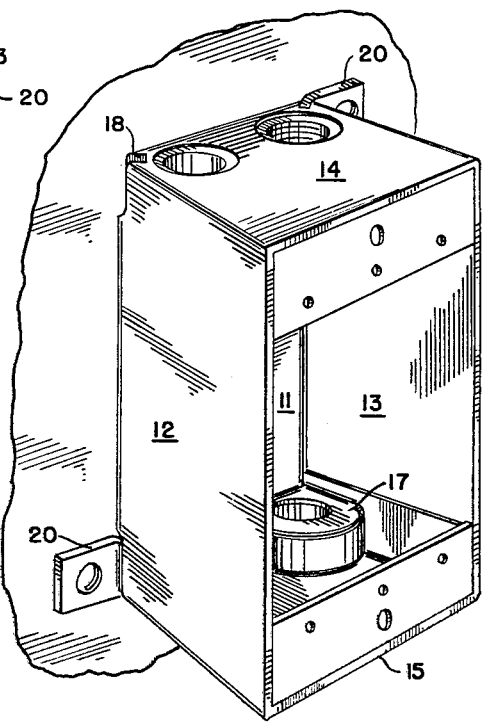
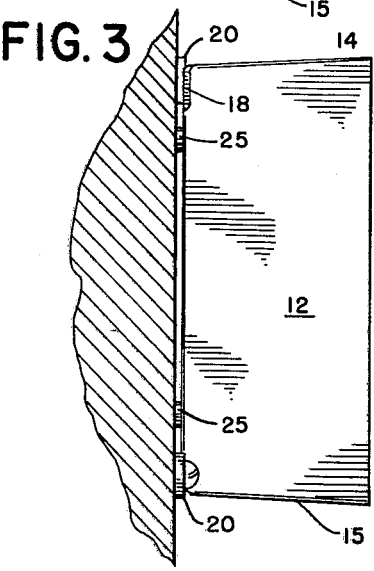
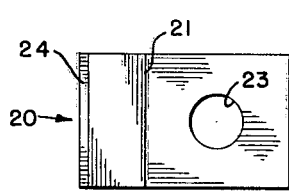
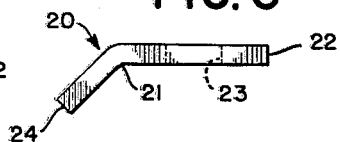
INVENTORS
MILTON WEITZMAN
MELVIN GOULD
BY
ATTORNEYS

United States Patent Office 3,197,548
Patented July 27, 1965

3,197,548
WEATHERPROOF ELECTRICAL OUTLET BOX
AND MOUNTING MEANS THEREFOR
Milton Weitzman, Bayside, and Melvin Gould, Laurelton, N.Y., assignors to Slater Electric Inc., Glen Cove, N.Y., a corporation of New York
Filed Apr. 22, 1963, Ser. No. 274,737
5 Claims. (Cl. 174—58)

The present invention relates to outlet boxes and particularly outlet boxes of the type known as weatherproof and which are intended for the mounting of electrical wiring devices in exposed locations.

Although weatherproof outlet boxes are frequently mounted on rigid conduit and are supported by that conduit, there are many times when such boxes are mounted on the surface of structures either of wooden or masonry construction.

At times when it was necessary to surface mount a weatherproof outlet box this has been accomplished by drilling holes through the base of the box and inserting fasteners such as screws through these holes. This mounting method is destructive of the weatherproof qualities of the box and it is therefore desirable to provide a weatherproof box with surface mounting means which do not require that holes be made in the box.

One known manner of accomplishing this result is to provide recesses in the base or rear surface of the box, the box wall being thickened over part of the area of the recess in order to provide sufficient material so that a screw hole may be drilled and tapped. With this arrangement mounting straps are provided, one end of which is mounted in the recess and fastened to the box by a screw extending through the strap and into the tapped hole mentioned, the other end extending beyond the side wall of the box having a hole therethrough by means of which the box can be mounted to a structure.

This arrangement, although satisfactory, is expensive since it requires the thickening of the box wall and also requires that holes be drilled and tapped in four locations in order to provide for fixing the mounting strap adjacent any more of the four corners of the box.

Our present invention provides surface mounting means for weatherproof outlet boxes which retain the weatherproof qualities of the box without adding materially to the expense of manufacture thereof. This is accomplished by casting the box with slots extending inwardly at an angle substantially bisecting the angle between the side and base walls of the box, the slots extending from the end wall to a depth equal to the desired width of a mounting lug which is inserted in the slot.

It is therefore an object of the invention to provide a weatherproof outlet box adapted to be surface mounted without destroying or reducing the weatherproof qualities thereof.

It is another object of the invention to provide a box as described above wherein the mounting arrangement is simple and wherein all boxes may be produced with the necessary slots and only those which are to be used for surface mounting need have the mounting lugs provided therewith.

It is a still further object of the invention to provide such a box which may be manufactured at a cost substantially equal to the cost of manufacturing a box without such surface mounting means.

Other objects and features of the invention will be apparent when the following description is considered in connection with the annexed drawings, in which, FIGURE 1 is a rear elevational view of an outlet box incorporating our invention showing mounting lugs in position on two of the four corners thereof;

FIGURE 2 is a top plan view of the device of FIGURE 1;

FIGURE 3 is a side elevational view of the box of FIGURE 1 showing the box mounted on a surface;

FIGURE 4 is a perspective view of the box and mounting of FIGURE 3;

FIGURE 5 is an enlarged elevational view of one of the mounting lugs; and

FIGURE 6 is a side elevation of the lug of FIGURE 5.

Referring now to the drawings, there is shown at 10 a weatherproof outlet box of usual form having a base 11, side walls 12 and 13, and end walls 14 and 15. As is customary, the box is provided with a number of openings in the base and end walls such as those designated 16.

As is clear from the drawings, the walls are thickened in the manner indicated at 17 in the locations of these openings in order to provide a substantial thread area so that threaded conduit may be rigidly fixed to the box. These boxes are normally, when sold, provided with threaded plugs so that conduit receiving openings which are unused can be closed.

The box as thus far described is in common use and is not adapted to surface mounting because the only feasible way of so mounting the box is to drill openings through the base through which suitable fastening means extend. In accordance with our invention box 10 is provided at each of its corners with a slot 18 which, as seen particularly in FIGURE 2, extends inwardly at an angle of substantially 45° to the base 11 and side wall 12 or 13.

When the box is of the type illustrated, that is, of the type known as a 5-hole box having two holes in each end wall and one hole in the base, the slots can readily be cast since the bosses 17 provide material in the corner sufficient to assure that the slot can be formed without providing an opening into the box from the exterior.

In instances where a box has a lesser number of holes and the boss material is therefore not present in the corner as, for example, in a 3-hole box having a single opening in the center of each end wall and an opening in the rear wall or base 11, the mold is arranged to cause a slight thickening of the corner portion to provide a substitute for the hole bosses.

The slots 18 extend parallel to the long dimension of the box 10 a sufficient distance so that a mounting lug 20 of desired width can be utilized.

The mounting lugs 20 are simple pieces of strap steel or the like having a 45° bend therein as indicated at 21, the length from the bend 21 to one end, designated 22 in FIGURES 5 and 6, being that desirable to provide an opening 23 therein of sufficient size so that a relatively large screw may pass therethrough. The distance from the bend 21 to the opposite end 24 is of course substantially equal to or slightly greater than the depth of the slot 18.

As is seen from the above description the mounting lugs 20 are readily positioned in the mounting slots 18, and may be utilized in pairs as indicated or, if desired, may be utilized at each of the four corners to provide for an extremely rigid mounting of the device.

In order to assure that slight unevenness in the surface on which the box is mounted will not cause tipping thereof the box is provided on the exterior of its base or rear wall with a number of projections 25. These projections 25 are cast with the box and are of very slight extent lying substantially in the plane of the rear surface of the mounting lug 20 when that lug is installed.

In some instances it is desirable to mount an outlet box of the type herein discussed upon a post and the box of the instant invention with its mounting lugs is adaptable to such a mounting. It is only necessary to reverse the position of the lug in the slot 18 to thereby have the lug extend rearwardly in a direction parallel to the side wall rather than in the manner shown in FIGURE 2 in order to provide a mounting which is adapted to fix the box to a post which would be preferably of rectangular shape having one of its dimensions substantially equal to the width of the box base. Here again two mounting lugs, one at the top of the box and one at the bottom would be sufficient, but an additional one or two lugs might be used if desired.

Moreover, in some instances it would be desirable to mount some of the lugs in the position shown in FIGURE 2 and others on the opposite side of the base in the reverse position discussed hereinabove. This arrangement would obviously be well adapted to mounting of the box on the corner of a building or on a large post or the like.

In some instances it may be desirable to modify the slot arrangement to one in which the slots extend from the base or side wall inwardly parallel to the side or base respectively. When this is done the mounting lugs are correspondingly modified to provide two parallel portions joined by an offsetting portion to thus assure that the rear surface of the mounting lug is substantially flush with the exterior surface of the base or the exterior surface of the side wall as the case may be.

While we have described a preferred embodiment of the invention, it will be understood that we wish to be limited not by the foregoing description, but solely by the claims granted to us.

What is claimed is:

1. A cast weatherproof outlet box comprising, in combination, a base, side walls, end walls, thickened interior portions of said box walls at the corners thereof, a slot extending inwardly at the end will and into the said thickened portions from the junctions of the respective side wall and said base, at an angle to said base, each slot being opened to the corresponding end wall and extending inwardly therefrom for a predetermined distance, a mounting lug placed in at least one of said slots, said mounting lug having a thickness equal to the width of said slots and the length greater than the depth of said slots from the junction, said lug being bent along a line transverse to its longitudinal center line, said bend being at an angle equal to said slot angle whereby said lug extends outwardly parallel to said base and means in said outwardly extending portion of said mounting lug for mounting said lug to a surface on which said box is to be mounted.

2. A cast metal weatherproof outlet box comprising, in combination, a base, side walls, end walls, slots extending inwardly of the junction of said walls at the corners, each said slot substantially bisecting the angle between the respective sidewall and said base, said slots extending from said end walls along the junction of said side walls and said base for a predetermined distance and a mounting lug placed in at least one of said slots, each said lug having a thickness substantially equal to the width of said slots and being bent along a line transverse to its width at an angle equal to said slot angle whereby said lugs when inserted in said slots extend from said box parallel to either said base or said side walls, each said lug having means to fasten it to a surface to thereby mount the box on that surface.

3. A cast metal weatherproof outlet box comprising, in combination, a base, side walls, end walls, thickened portions of said box at the corners where said base, end and side walls meet, slots extending inwardly from the junctions of said walls at the corners, said slots extending into said thickened wall portions and substantially bisecting the angle between respective ones of said side walls and said base, said slots extending from said end walls along the junction of said side walls and base for a predetermined distance, a mounting lug in at least one of said slots, each said lug having a width substantially equal to said predetermined distance and being bent along a line transverse to its width at an angle equal to said slot angle whereby said lugs substantially fill said slots and extend from said box parallel to either said base or said side wall, said lug having an aperture therethrough in the area extending outside said slot whereby said lug may be fastened to a surface on which the box is to be supported.

4. A cast metal weatherproof outlet box comprising, in combination, a base, side walls, and end walls joining each other at 90° angles, thickened portions of said box at the corners where said base, end and side walls meet, slots extending inwardly from the junction of said walls at the corners, said slots extending into said thickened wall portions at a 45° angle to said base, said slots extending from said end walls along the junction of said side walls and base for a predetermined depth, and mounting lugs placed in said slots, said lugs having a thickness substantially equal to the width of said slots and a width substantially equal to said predetermined depth, said lugs being bent along lines transverse to their width at an angle of 45° to said base whereby said lugs extend from said box parallel to either said base or said side wall, said lugs having apertures therethrough in the area outside said slots whereby said lugs can be fixed in position to thereby mount said box on a surface parallel to said base.

5. A cast metal weatherproof outlet box comprising, in combination, a base, side walls, and end walls joining each other at 90° angles, thickened portions of said box at the corners where said base, end and side walls meet, said thickened portions extending along said base and side walls inwardly from said end walls, slots extending inwardly from the junction of said walls at the corners, said slots extending into said thickened wall portions at a 45° angle to said base and side walls, said slots extending from said end walls along said side walls and base for a predetermined depth, and mounting lugs in said slots, said lugs having a thickness substantially equal to the width of said slots and a width substantially equal to said predetermined depth, said lugs being bent along lines transverse to their width at an angle of 45° to said base whereby said lugs extend from said box parallel to either said base or said side wall, said lugs having apertures therethrough in the area outside said slots whereby said lugs can be fixed in position to thereby mount said box on a surface parallel to said base, and a plurality of projections extending rearwardly from said base and terminating in a plane parallel to and slightly spaced from said base to thereby assure that the box may be rigidly mounted on a surface.

References Cited by the Examiner

UNITED STATES PATENTS

| | | | |
|---|---|---|---|
| 942,002 | 11/09 | Le Manquais | 220—3.94 |
| 956,674 | 5/10 | Bonnell | 220—3.2 |
| 1,262,988 | 4/18 | Sieffert | 220—3.9 |
| 2,399,491 | 4/46 | Lindstrom | 248—27 X |
| 2,908,416 | 10/59 | Rudolph et al. | 220—3.6 |
| 2,924,639 | 2/60 | Zelt | 220—3.92 X |
| 2,951,148 | 8/60 | Stahlhut | 220—3.94 X |
| 3,052,369 | 9/62 | Taibi | 174—58 X |

FOREIGN PATENTS

| | | |
|---|---|---|
| 40,997 | 9/32 | France. |
| 1,152,182 | 2/58 | France. |
| 1,089,033 | 9/60 | Germany. |
| 145,356 | 7/20 | Great Britain. |
| 735,240 | 8/55 | Great Britain. |
| 760,597 | 11/56 | Great Britain. |
| 777,173 | 6/57 | Great Britain. |

JOHN F. BURNS, *Primary Examiner.*

JOHN P. WILDMAN, DARRELL L. CLAY, *Examiners.*